Figures 1, 5:
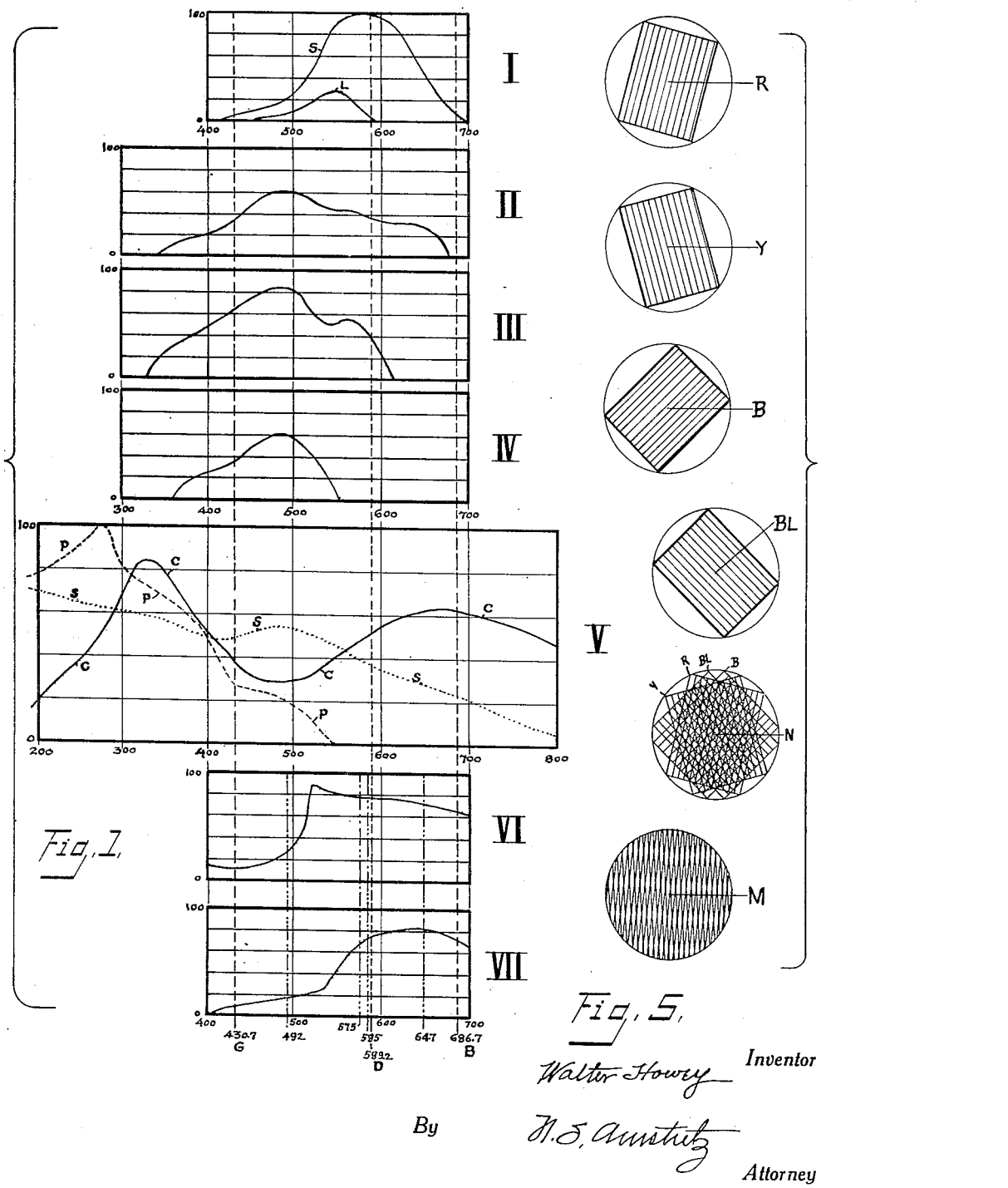

March 15, 1932. W. HOWEY 1,849,544
PROCESS OF AND APPARATUS FOR PRODUCING PRINTING PLATES
Filed Jan. 31, 1930  3 Sheets-Sheet 1

Walter Howey Inventor

By H. S. Amstutz
Attorney

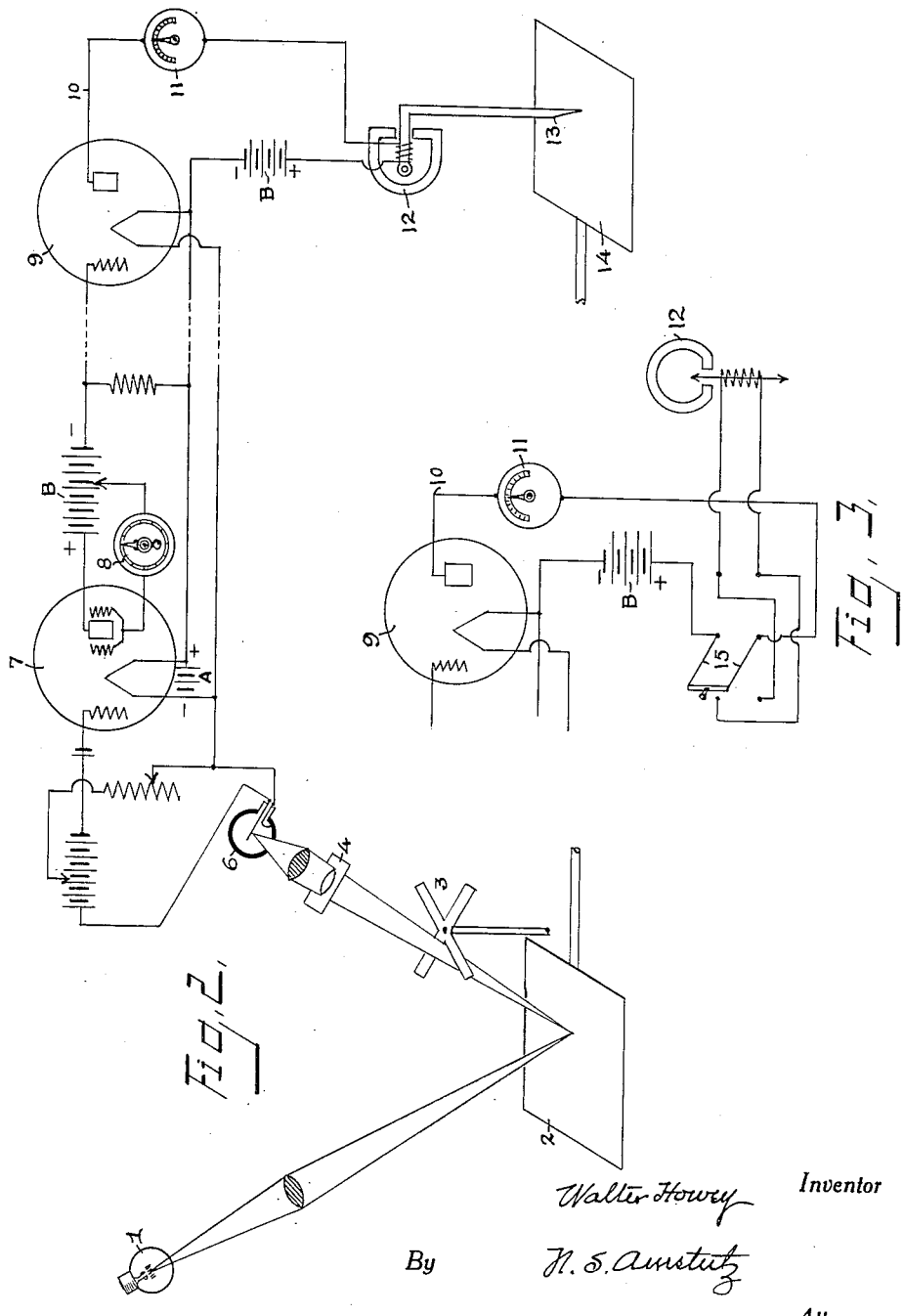

March 15, 1932.   W. HOWEY   1,849,544

PROCESS OF AND APPARATUS FOR PRODUCING PRINTING PLATES

Filed Jan. 31, 1930   3 Sheets-Sheet 3

| CIRCUIT CHARACTERISTICS WITH FILTERS | | | | | | | | |
|---|---|---|---|---|---|---|---|---|
| | 1 | | 2 | | 3 | | 4 | |
| | IN | OUT | IN | OUT | IN | OUT | IN | OUT |
| | | | | | | | | |
| | | | | | | | | |
| | | | | | | | | |
| | | | | | | | | |
| | | | | | | | | |
| | | | | | | | | |
| | | | | | | | | |

| | | COLOR CONTROL SETTING FOR CORRECT ENGRAVING WITH FILTERS | | |
|---|---|---|---|---|
| (minus Blue) YELLOW | 1 | | | |
| (minus Green) MAGENTA | 2 | DENSITY FILTER | WHITE LIGHT | |
| (minus Red) BLUE GREEN | 3 | 4 | 5 | |

Fig. 4.

Walter Howey  Inventor

By  N. S. Amstutz

Attorney

Patented Mar. 15, 1932

1,849,544

UNITED STATES PATENT OFFICE

WALTER HOWEY, OF NEW YORK, N. Y.

PROCESS OF AND APPARATUS FOR PRODUCING PRINTING PLATES

Application filed January 31, 1930. Serial No. 424,809.

My invention relates to improvements in the process of and apparatus for producing printing plates, and it more especially relates to the features pointed out in the annexed claims.

The purpose of my invention is to provide a process and apparatus for automatically producing engravings by means of a photo-electric cell scanning system coupled to an electric net-work which comprises voltage amplifying tubes and power tubes; that modulates the direct current output of such a net work to correspond to the picture frequency and the tonal values of the object which is being scanned; that utilizes such output to operate a dynamically or inductively driven motor cutting tool for engraving on a suitable surface; that may cause the engraving tool to automatically interpret the object which is being scanned, in line, tone and color separation plates without recourse to the usual complicated steps of conventional photo engraving.

I also provide in this process a direct current power output to be modulated by the picture frequency and the direct current tonal component of light and shade; that maintains a sufficient power output required at all times to do the engraving through a calibrated control and because of these agencies and the cooperation of a gain or color control calibrated with output meters in the amplifying net work I am able to produce engravings for printing or other purposes directly on any desired surfaces without the intervention of well known process engraving expedients.

A further object of my invention is to provide a process in which photo-electric amplifying means are used to control mechanical means for producing relief or intaglio engravings with great precision, without placing dependence on any of the limiting steps to which photo-engraving is subject, such as, screen separation, diaphragm shapes and sizes, filtered color separation, chemical intensifications, chemical reducers, stripping, reversals, staging, routing, mounting, etc., involving more than one hundred manual operations subject to the attendant human equations of trial and error in the production of engravings.

Another object of my process is to provide certain steps and coordinated means for entirely eliminating the usual variability of timing required in making complementary color separation negatives used in making photo-engravings for process color printing; that accomplishes this by providing means for charting and calibrating the differences in exposure time required when photographing through filters which permit certain selected radiations of the visible spectrum to pass; that recognizes the varying responsitivity of individual photo-electric cells, and the color value of a subject and coordinates these with the color values of the inks or dyes to be used in printing the engraving; that also provides for an accurate calibration of the various adjustments so as to substitute a balancing amount of amplification for the lag of a filter or photo-cell; that further makes provision for the substitution of photo-cells having a limited sensitivity to any part of the chromatic scale of the visible spectrum, during the period of engraving and at the same time matching the inks or dyes by proper mixings to correspond to value of the light filtered photo electric measurements of the color values of the object, without placing dependence upon the fallibility of the human eye, as no two eyes see alike.

My present process is an improvement over that invented by me and which is described in Patent No. 1,719,621. That invention is directed to the line reproduction of a black and white type of engraving through the use of a photo electric cell scanning system coupled in an alternating current amplifying network of transformers and three-element vacuum relay tubes to direct the cutting depth of a tapered routing tool for producing engravings to correspond to the frequency of the picture which is being scanned. This system (Patent No. 1,719,621) does not lend itself to the production of a true automatic engraving because only an alternating current and transformer coupled amplification is used. The reason for this is that there are two related components which must be recognized when a continuous tone subject, particularly one in color, is to be engraved. One of these is an alternating or picture frequency component and the other is a direct current or tone component. My prior invention will not engrave both the picture frequency and the tone frequency of a continuous tone picture of one or many colors. What I call picture frequency corresponds to a change in outline of the subject which will set up an alternating current output in a photo cell. This may be amplified with transformer coupling, the only type shown in my Patent No. 1,719,621. Tone frequency refers to the very minute variation of light and shade of the subject which produce a simple direct current output from a photo cell that is not amplified by transfomers. The circuit shown in Fig. 2 is a resistance coupling direct current amplifier. It will amplify the picture frequency, the tone frequency and the color frequency.

With these and other ends in view, I illustrate in the accompanying drawings such instances of adaptation as will disclose the broad underlying features of my invention without limiting myself to the specific details shown thereon and described herein.

Figure 1 shows a series of diagrammatic representations of seven graphs illustrating the coordinate relation of spectral values under varying physical and optical conditions. These comprise the following: At I the graph indicates color as the eye sees it, both L at low intensity and S at high sensitivity. At II, III and IV the portions of the spectrum colors recognized by sensitive plates in the camera; in II, by a panchromatic emulsion; in III by an orthochromatic emulsion; and in IV, by an ordinary commercial emulsion. In V, a group of three graphs is shown. These represent color as it is recognized by photo-electric cells, P for potassium cell, S for a sodium cell, and C for a cæsium cell. At VI the graph shows the degree in which white light is transmitted through different light filters. At VII the graph shows the reflection characteristics of standard color inks.

Figure 2 is a diagrammatic representation of an optical and electrical system which is aperiodic throughout employed in the automatic engraving of colored objects.

Figure 3 is a diagrammatic representation of the last amplification stage of Figure 2 showing how positives may be reproduced from positives, negatives from negatives, positives from negatives, or, vice versa, in the shape of relief or intaglio engravings. In this diagram the substitution of any cooperating light valve for the electrically controlled mechanical graver will produce a planographic result.

Figure 4 is a diagram of a color chart record.

Figure 5 is a diagrammatic representative of different line angles for the red, yellow, blue and black printing representations of a colored object to secure a freedom from moire effects; R, showing the red angle; Y, the yellow angle; B, the blue angle; and B1 the black angle; and at N, the normal composite relation of a superimposition of the four printing angles; and at M, a moire effect is shown.

In adapting my invention to conform to the exigencies of varying conditions I may use whatever alternatives and equivalents of construction that may be found desirable without departing from the broad spirit of my invention.

This process is particularly useful in the production of multi-color plates for printing purposes. It automatically corrects the errors incident in the use of color filters, the discrepencies of reflection from different colored inks and it eliminates a multitude of trial and error steps inherently associated with the customary methods of color reproduction for printing purposes. In the use of the term photo-electric cell I include any light sensitive means.

The various graphs shown in Figure 1 illustrate the many variable conditions encountered in the making of printing plates to represent colored objects. An outstanding feature of my invention is the elimination of the usual difference in exposure time for the red, yellow and blue constituents of colored objects by electrical compensation which enables me to require substantially the same time to produce each color record as against the large difference in time necessary at present to produce the red, yellow and blue separation negatives. In this figure all the graphs are shown in coordinate spectral relation so as to make it easy to compare them with each other. Certain Frauenhofer lines are projected across all the graphs.

The system shown diagrammatically in Figure 2 comprises a subject 2 and a reproduction 14, both suitably mounted for simultaneous movement in the same directions by any desired means (not shown). Light from a suitable source 1 is directed to the object through a lens which concentrates the beam at a point from which it is reflected to a light sensitive cell 6 through a color filter 4 and any desired cooperating lens. The reflected beam of light may be interrupted if desired by a so-called light chopper 3, whose rotation is coordinated with the movement of the object 2 and the reproduction 14 in any desired manner (not shown).

The photo-electric cell 6 is connected in a local battery circuit which includes the grid portion of the amplifying tube 7. This tube has the usual filament and plate elements enclosed therein. In addition, it comprises a screen grid for the plate and a depth of color control circuit 8 associated with the B battery that is coupled to the plate of the amplifying tube 7 and the grid of the amplifying tube 9. The filaments of the amplifying tubes are connected in parallel and are supplied by the "A" battery.

The plate circuit 10 of the last amplifying stage includes an ammeter 11 which indicates the output of the system used in operating the recording device 12. This last stage of amplification also includes another B battery. The recording device 12 comprises a pointed engraving tool 13, or it may be instead an equivalent light valve in case the record 14 is made on a light sensitive surface. It is of course obvious that additional stages of amplification may be used between the amplifying tubes 7 and 9 where the circuit connections between the tubes are shown by dotted lines.

To recapitulate, light from a constant source is focused upon the object—copy, may be reflected through a color filter upon a photo-electric cell. The beam reflected to the color filter being made intermittent in any desired manner.

The varying lights and shades of the object impressed upon the light sensitive cell subject the grid of the amplifying tube to a varying potential, the output of which may be varied irrespective of the input by a variable volume or color control which includes the screen grid of the plate of the amplifying tube. These highly amplified current variations may be increased by additional stages of amplification and their attendant circuits to supply an output current of sufficient strength which controls the depth movement of a recording tool or the equivalent movement of an electrically controlled light valve.

The color control forming a part of the screen grid circuit may have large scale indications which are coordinated with the power output ammeter for easy comparison, so that for a uniform power output under all conditions the color control in the screen grid circuit can be varied to compensate for the variable light transmission characteristics of the different color selecting filters interposed between the object and the sensitive cell. A further variant of the recording portion of my system comprising the elements 11, 12 and 13 is attained as shown diagrammatically in Figure 3, wherein a double pole switch 15 is shown for reversing the current supply to the recording device 12 so that outgoing current variations representing a positive subject may be reproduced as a positive or as a negative; or conversely, if the subject should be a negative, it may be reproduced as a negative or a positive, or if desired the reproduction can be made as a relief or intaglio engraving, or as a surface reproduction through the intermediary of any light valve, such for instance, as that used in the Blondell type of oscillograph. All of these different results are secured by the simple manipulation of the switch 15.

Reverting to Figure 1, all of the curves shown fall within the visible spectrum ranging from infra red to ultra violet. The S curve of I indicates color sensation as observed in sunlight, while the curve L indicates the responsiveness of the eye to color sensations under artificial or inferior illumination when the blue and red portions of the spectrum may both appear as black. The color sensitivity of the various photographic emulsions are shown, as heretofore pointed out, by the curves II, III and IV. The group of curves V at P represents the sensitivity of a potassium hydride, or hard cell, which is extremely responsive to ultra violet light, but insensitive to orange or red portions of the spectrum. The curve S of the sodium cell is but slightly responsive at the red end of the spectrum, more so toward the middle portion, and somewhat more toward the ultra violet. The C curve of the cæsium cell is quite responsive at both ends of the spectrum. It has an irregular output however over the entire range of color from the infra red to the ultra violet. The curve VI in its height above the base line indicates the amount of constant light which is transmitted through color filters; and conversely, the curve VII in its distance above the base line indicates the amount of white light reflected from ink colors corresponding to different portions of the spectrum.

It becomes obvious that any reproduction of colored subjects cannot be made by simply scanning the "copy" whether it be by reflected or transmitted light and impressing the color components of variations of light and shade of the subject upon a light sensitive cell through color filters and subsequent amplifying means without making compensatory corrections. In addition to these variables, there are those found in photo-electric cells which at present do not have the same characteristics, even though made to the same design. In addition to these, there is also the variation found in a lack of standardization in the matching of dyes or inks and it is the overcoming of these variable factors which constitutes the broad scope of my invention.

As already stated, the many variations disclosed by the curves of Figure 1 disclose how impossible it is to produce a reproduction for printing or other purposes by depending upon the output of an amplification circuit to control the recording means without making compensatory corrections. It may be pointed out that in ordinary color separation the exposure time required for the blue portion of the copy through its compensatory filter is many times greater than that required for the exposures through the complementary filters for the red and yellow portions of the object. All of these practical differences make the existing processes of color reproduction subject to unnecessary time consuming steps which are further accentuated by the personal equations of different operators, and these untoward conditions are eliminated with my process which utilizes a constant speed for scanning and reproducing for each one of the color separations.

The characteristics of the optical, physical and electrical portions of my system are recorded on a chart in Figure 4, which are quantitatively determined in advance of operation. These are indicated on the control 8 and the power output indicator 11. The values of the input and output factors are recorded for the primary colors of the object or of the inks used in relation to the graded monocolored tone values ranging from dead black to pure white, shown at the left hand edge of Figure 4.

The data entered on such a chart make it possible to substitute the power factor of the output circuit for the variable time factor as ordinarily used in making photographic color separations and enables one to find settings of these two controls, which with a constant scanning light and constant recording output will automatically straighten the variable characteristics of the photo-electric cells, the filters used, the color reflections from the object, and any circuit variants at one and the same time.

In the respective filter columns opposite the graded monotone strip the setting for the variable control 8 is entered in the "in" column alongside of the constant value of the control 11 in the "out" column. The necessary power output for uniform engraving having been determined, the subsequent procedure is as follows: A color card having noted thereon the varied densities and color values in the spaces at the right of Figure 3 is moved progressively so that each density may be scanned in turn for each of the monochromatic light filters and the successive readings of the control 8 and the output meter 11 are entered on the color chart in their respective spaces.

This affords a comprehensive curve of the overall characteristics of the unit which establishes a standard for color mixing and the matching of inks or dyes used in color printing. The process is then repeated, except that for each color separation filter the control 8 is adjusted until the ammeter reading indicates the required power output which is deemed the most suitable for uniform engraving, and which when found is entered on the color chart.

Once having determined these settings they may be regarded as constant for the particular cell, light and current source and need not be changed unless the characteristics of the unit have been altered. However, it may be deemed desirable to take advantage of the different color response characteristics of various photoelectric cells, or cells of various types due to the fact that, as already noted, the potassium hydride cell has the highest output response at the violet end of the spectrum, the sodium cell at the middle of the spectrum, and the caesium cell at the red end. The cells may be interchanged, measured, and the settings of the control 8 found for a uniform engraving output irrespective of the varied cell characteristic.

Once the color control characteristics have been determined through the scanning of an analysis chart (Figure 4), it is replaced by the picture or subject which is to be reproduced and if a multi-color reproduction is desired the subject is scanned once for each color separation in connection with the appropriate color filter in the associated photoelectric system. The color control setting is fixed as that established for uniform engraving and a separate printing surface is engraved for each color separation. As ordinarily used, individual printing plates are made for the red, yellow and blue values of the object and at times a fourth plate representing a neutral gray or black is also made.

In the usual photoengraving process moire is produced when the angles of the screen lines of the separate plates are not properly fixed. The existence of uncontrolled moire will distort or ruin the value of any reproduction. It is ordinarily avoided by shifting the angle of the screen thirty degrees or more for each color plate engraved. If this angle is less, a true reproduction cannot be secured. As the process described herein does not permit of screen rotation to avoid moire, this is accomplished by swinging the object or copy to a separate angle for each plate, as indicated in Figure 5. In this figure N represents a pleasing pattern formed by right angled lines, and M represents an obtrusive effect, objectionable for printing plate purposes.

Should it be found desirable to utilize the inherent uncompensated variables of the system for the reproduction of arbitrary patterns of one kind or another, it may be done by arbitrarily producing moire of whatever distortion will produce the desired effect, or by altering the color settings of the control 8 from those listed on a chart (Figure 3), or by altering the relation of scanning and engraving the object, or by combinations of these methods. By so doing various curious patterns may be produced which can only be duplicated if the exact same settings are used throughout. There is an unlimited range of combinations that the fancy of the operator may select.

The reference to constancy in the recording device, means that the maximum power output from the amplifying system is constant for certain specific recording conditions, such as the kind of material used, depth of engraving, speed of traverse, etc., etc. Whatever variations there may be in the input, these are compensated by the screen grid control 8. If the required output for a given kind of recording is a certain wattage, then it remains the same for each separate reproduction thus effectively overcoming the variable time element encountered in ordinary color separation processes.

It is of course understood that I do not limit myself to the specific circuit arrangement of the amplifying system, as any desired change may be made therein which will not forego the possibility of varying an input current according to the varying color characteristics of a subject and simultaneously maintaining a constant current output for recording the color components of the subject. I also do not limit myself to the specific use of any given light sensitive or so-called photoelectric cell because it is immaterial whether their sensitivity is dependent on variable resistance or variable ionic emissions or otherwise. As already pointed out certain cells are more responsive to certain portions of the spectrum and thus may more effectively co-operate with certain color filters, hence I do not limit myself to the specific order in which the cells are used in conjunction with the color filters.

Reproduction for color separation negatives or positive films or plates is accomplished by changing the optical system to transmitted light. Corrections to make unnecessary the trial and error process of staging and re-etching of photoengravings, are determined in advance by color control 8 and the calibration steps hereinbefore outlined.

What I claim is:

1. In the automatic engraving of a pictorial subject, means for synchronously scanning the subject and engraving a surface, light sensitive means for scanning the subject, an aperiodic amplifier responsive to the light sensitive means, a control for varying the voltage amplification of the system to maintain adequate power output suitable for engraving, and means utilizing said power output for producing engravings of the subject suitable for printing.

2. The automatic engraving of a colored subject, comprising means for photo electrically scanning the subject, means for filtering the color characteristics of said subject to produce color separations, an adjustable aperiodic amplifying system responsive to the photo electric scanning and engraving means responsive to the amplifier for engraving color separation plates suitable for color printing.

3. An engraving system comprising photo electric means for scanning the pictorial characteristics of a subject, an aperiodic vacuum tube amplifying system responsive to the scanning, indicating means for observing the response of the amplifying system to the pictorial characteristics of the subject, a power control in the amplifying system, indicating means for observing the response of the amplifying system to the power control, and means for engraving a reproduction of the subject for direct printing.

4. In a system of the class described, indicating means for observing the response of a light sensitive cell and its associated amplifying system to a pictorial subject, a power control for varying the response of the amplifying system, and means for modifying such response to produce engravings differing in tonal characteristics from the characteristics of the subject.

5. The process of automatic color separation engraving, which consists in successively scanning a subject photo electrically for each selected color, in modifying the scanning of each color by a suitable filter, in causing the modified scanning to modulate a direct current amplification, and in causing the amplified current to control the engraving of a separate surface for each color adaptable for direct printing.

6. The process of automatic color separation engraving, which consists in maintaining a subject so as to be scanned at different angles for each separate color, in successively scanning each color photoelectrically, in modifying the light and shade characteristics of the subject with a color filter for each scanning, in causing the modified scanning to be amplified as direct current, and in causing such current to control the engraving of a separate surface for each color scanned.

In testimony whereof I affix my signature.

WALTER HOWEY.